United States Patent
Wang et al.

(10) Patent No.: US 10,754,188 B2
(45) Date of Patent: Aug. 25, 2020

(54) LIQUID CRYSTAL LENS AND DISPLAY DEVICE

(71) Applicant: BOE Technology Group Co., Ltd., Beijing (CN)

(72) Inventors: Qian Wang, Beijing (CN); Xiaochuan Chen, Beijing (CN); Wenqing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 41 days.

(21) Appl. No.: 16/316,874

(22) PCT Filed: Feb. 11, 2018

(86) PCT No.: PCT/CN2018/076291
§ 371 (c)(1),
(2) Date: Jan. 10, 2019

(87) PCT Pub. No.: WO2018/171361
PCT Pub. Date: Sep. 27, 2018

(65) Prior Publication Data
US 2020/0183226 A1    Jun. 11, 2020

(30) Foreign Application Priority Data
Mar. 22, 2017   (CN) .......................... 2017 1 0173543

(51) Int. Cl.
*G02F 1/1343* (2006.01)
*G02F 1/1335* (2006.01)

(52) U.S. Cl.
CPC .. *G02F 1/133528* (2013.01); *G02F 1/134309* (2013.01); *G02F 2001/133548* (2013.01)

(58) Field of Classification Search
CPC .............................................. G02F 1/134309
See application file for complete search history.

(56) References Cited

U.S. PATENT DOCUMENTS

| | | | |
|---|---|---|---|
| 2012/0206666 A1 | 8/2012 | Jeong et al. | |
| 2015/0219911 A1* | 8/2015 | Cho | G02B 30/27 349/15 |

(Continued)

FOREIGN PATENT DOCUMENTS

| | | |
|---|---|---|
| CN | 104714329 A | 6/2015 |
| CN | 105468201 A | 4/2016 |

(Continued)

OTHER PUBLICATIONS

Office Action for corresponding Chinese Application 201710173543.7 dated Jul. 10, 2018.

(Continued)

*Primary Examiner* — James A Dudek
(74) *Attorney, Agent, or Firm* — Arent Fox LLP; Michael Fainberg

(57) ABSTRACT

A liquid crystal lens and a display device, for improving the efficiency of natural light modulation and lowering the device profile. The liquid crystal lens includes an upper substrate and a lower substrate configured opposite each other, liquid crystal molecules located between the upper substrate and the lower substrate, a plurality of upper electrodes located on the upper substrate, and a plurality of lower electrodes located on the lower substrate. Each lower electrode includes a plurality of metal wire grid polarizers. The upper electrodes respectively correspond to the lower electrodes. An orthographic projection of each upper electrode and that of the corresponding lower electrode on the lower substrate form a ring-shaped electrode structure, and each upper electrode and the corresponding lower electrode are configured to receive voltages of different potential.

20 Claims, 7 Drawing Sheets

(56) References Cited

U.S. PATENT DOCUMENTS

2016/0313586 A1* 10/2016 Xie .................. G02F 1/134309
2017/0220158 A1   8/2017 Peng et al.
2018/0275459 A1   9/2018 Wang

FOREIGN PATENT DOCUMENTS

| CN | 105700224 A | 6/2016 |
| CN | 106444176 A | 2/2017 |
| CN | 106773380 A | 5/2017 |

OTHER PUBLICATIONS

Office Action for corresponding Chinese Application 201710173543.7 dated Nov. 5, 2018.
Office Action for corresponding Chinese Application 201710173543.7 dated Apr. 12, 2019.
International Search Report corresponding to PCT/CN2018/076291 dated May 9, 2018.
Decision of Rejection for corresponding Chinese Application 201710173543.7 dated May 6, 2020.

* cited by examiner

LIQUID CRYSTAL LENS AND DISPLAY DEVICE

CROSS-REFERENCE TO RELATED APPLICATION

This application is a National Stage of International Application No. PCT/CN2018/076291, filed Feb. 11, 2018, which claims priority to Chinese Patent Application No. 201710173543.7, filed Mar. 22, 2017, both of which are hereby incorporated by reference in their entireties.

FIELD

This disclosure relates to the field of display technologies and particularly to a liquid crystal lens and a display device.

BACKGROUND

A liquid crystal modulation element provides a delay for a light wave which passes a liquid crystal layer using an electronically controlled birefringence effect to change a polarization condition of the light wave, thereby forming image light. For example, a liquid crystal modulation element serving as a two-dimensional pixel light switch is used as a liquid crystal projector of an image modulation element of a projection display device.

Since the liquid crystal modulation element, i.e. a liquid crystal lens, depends on a polarization state of incident light and natural light needs to be modulated by a liquid crystal lens composed of a double-layer liquid crystal cell, a thickness of a whole device thereof increases accordingly in the related art.

SUMMARY

The embodiments of the disclosure provide a liquid crystal lens, where the liquid crystal lens includes: an upper substrate; a lower substrate arranged opposite to the upper substrate; liquid crystal molecules located between the upper substrate and the lower substrate; a plurality of upper electrodes located on the upper substrate; and a plurality of lower electrodes located on the lower substrate, where each of the plurality of lower electrodes includes a plurality of metal wire grid polarizers, the plurality of upper electrodes correspond to the plurality of lower electrodes in a one-to-one manner, an orthographic projection of each of the plurality of upper electrodes and an orthographic projection of a corresponding lower electrode onto the lower substrate form an encircled electrode element, and each of the plurality of upper electrodes and the corresponding lower electrode are configured to receive voltage at different potentials.

Optionally, each of the plurality of upper electrodes and the corresponding lower electrode which form the encircled electrode element have consistent shapes, and spacing between the orthographic projection of each of the plurality of upper electrodes and the orthographic projection of the corresponding lower electrode onto the lower substrate is identical.

Optionally, the plurality of upper electrodes and the plurality of lower electrodes are annular.

Optionally, each encircled electrode element and at least one surrounding encircled electrode element are arranged in an overlapping manner.

Optionally, each encircled electrode element and four surrounding encircled electrode elements are arranged in an overlapping manner.

Optionally, the plurality of metal wire grid polarizers are arranged at a side of the lower substrate away from the liquid crystal molecules; or the plurality of metal wire grid polarizers are arranged at a side of the lower substrate proximate to the liquid crystal molecules.

Optionally, a slit with an encircled structure exists between two adjacent metal wire grid polarizers in each of the plurality of lower electrodes.

Optionally, each of the plurality of metal wire grid polarizers in each of the plurality of lower electrodes is divided into multiple sections by multiple gaps which point to outside from a center of the encircled electrode element.

Optionally, included angles between adjacent gaps are same.

Optionally, the liquid crystal molecules are blue phase liquid crystal molecules.

The embodiments of the disclosure also provide a display device, where the display device includes the liquid crystal lens above according to the embodiments of the disclosure.

DETAILED DESCRIPTION OF THE EMBODIMENTS

Figure 1A:
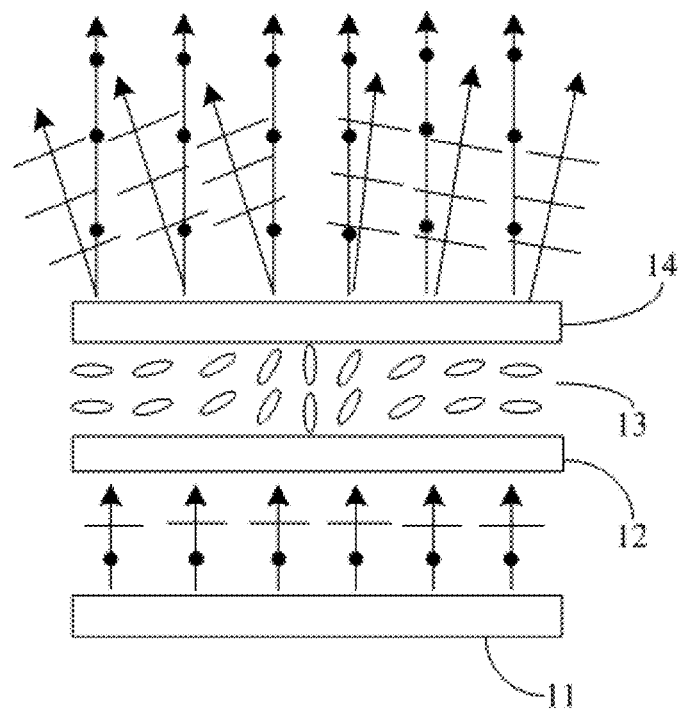
FIG. 1A and FIG. 1B are respective schematic structural diagrams of modulation of incident light by a single-layer liquid crystal cell in the related art.
Figure 1B:
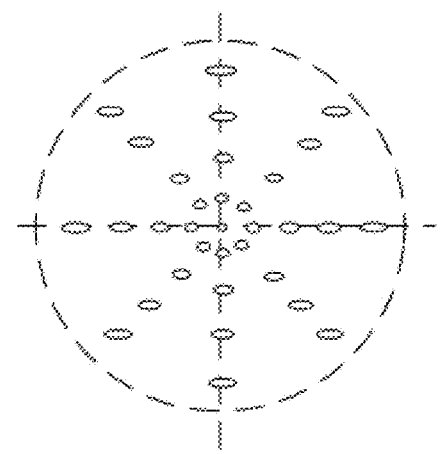

FIG. 1A illustrates a modulation of a single-layer liquid crystal cell for the incident light in the related art; the liquid crystal cell includes an array substrate 12 and a color filter substrate 14 arranged opposite to each other, and a liquid crystal layer 13 located between the array substrate 12 and the color filter substrate 14; where a frictional orientation direction for the liquid crystal of an orientation film (not illustrated) included in the liquid crystal cell is parallel to a paper surface, as illustrated in FIG. 1B. In FIG. 1A, an arrow direction represents a propagation direction of light emitted by a backlight 11, a transverse line on the light represents a polarization component parallel to the paper surface, and a black dot represents a polarization component perpendicular to the paper surface. As illustrated in FIG. 1A, the liquid crystal cell acts only on the light with a polarization direction parallel to the paper surface, and the light with a polarization direction perpendicular to the paper surface is emitted without any action directly.

Figure 2A:
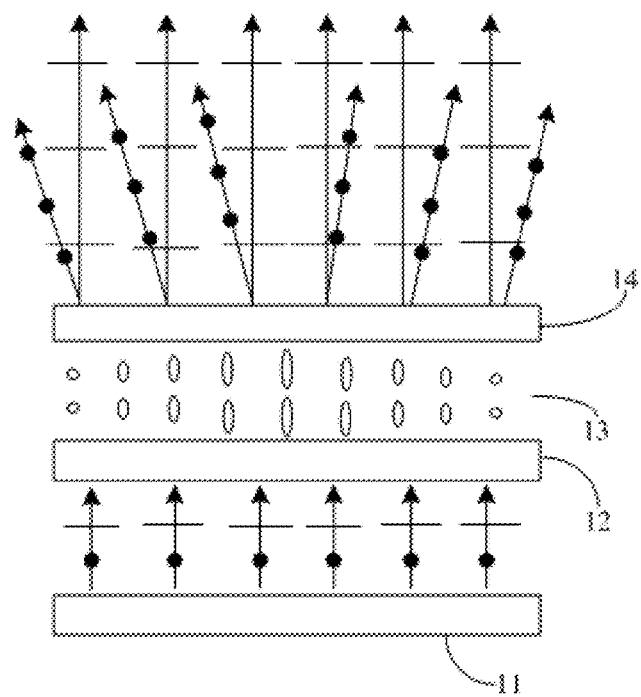
FIG. 2A and FIG. 2B are respective schematic structural diagrams of modulation of incident light by another single-layer liquid crystal cell in the related art.
Figure 2B:
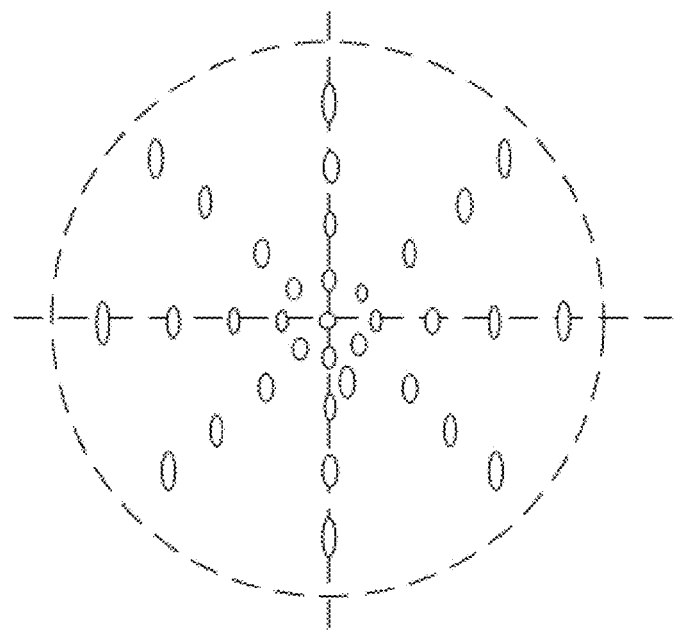

FIG. 2A illustrates a modulation of another single-layer liquid crystal cell for the incident light in the related art; where a frictional orientation direction for the liquid crystal of an orientation film (not illustrated) included in the liquid crystal cell is perpendicular to the paper surface, as illustrated in FIG. 2B. As illustrated in FIG. 2A, the liquid crystal cell acts only on the light with a polarization direction perpendicular to the paper surface, and the light with a polarization direction parallel to the paper surface is emitted without any action directly.

Figure 3:
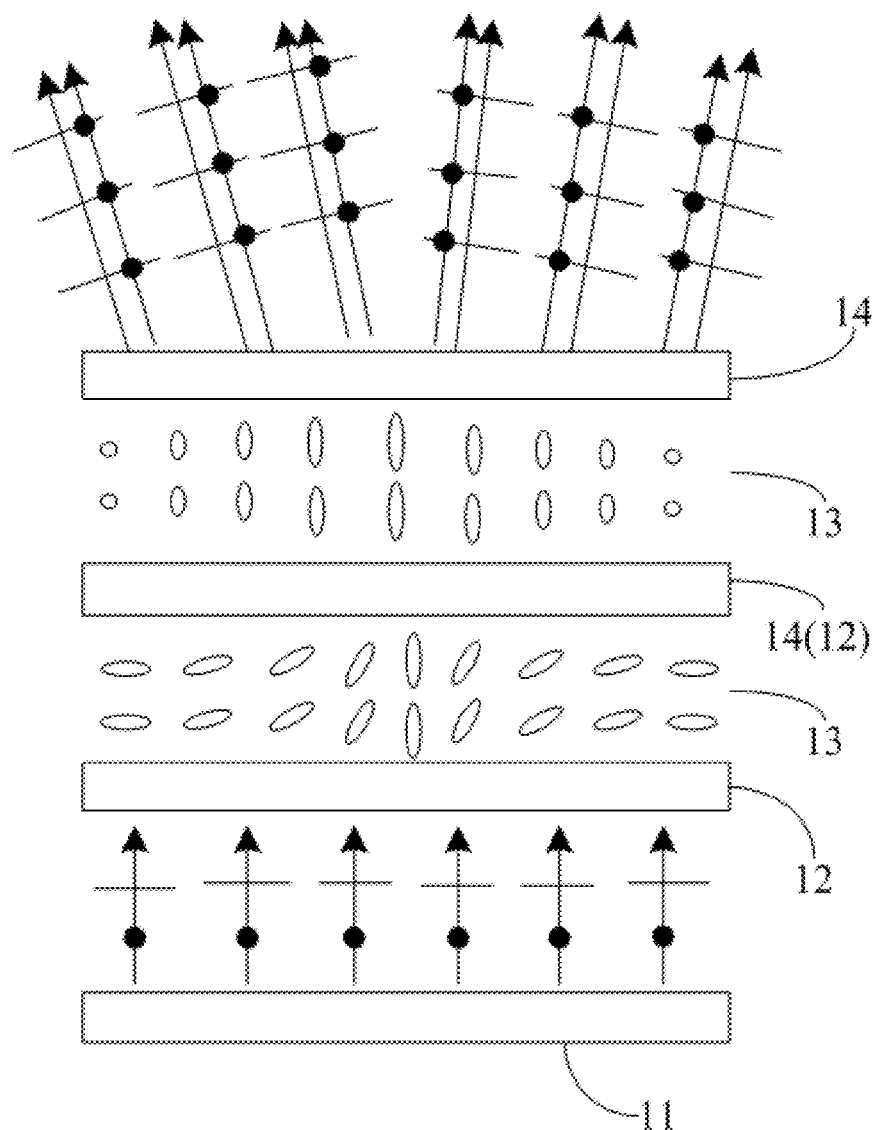
FIG. 3 is a schematic structural diagram of modulation of incident light by a double-layer liquid crystal cell in the related art.

For the purpose of acting on the polarized light perpendicular to the paper surface and the polarized light parallel to the paper surface at the same time, the liquid crystal cell is generally set as a double-layer structure in the related art, where as illustrated in FIG. 3, a frictional orientation direction for the liquid crystal of an orientation film included in a lower liquid crystal cell is parallel to the paper surface and a frictional orientation direction for the liquid crystal of an orientation film included in an upper liquid crystal cell is perpendicular to the paper surface. As can be seen from FIG. 3, the liquid crystal cell with the double-layer structure can act on components of the natural light in the parallel and perpendicular polarization directions at the same time, thereby realizing modulation for the natural light. However, the liquid crystal cell with the double-layer structure in the related art is relatively thick and cannot be thinned.

On this basis, the embodiments of the disclosure provide a liquid crystal lens and a display device to improve the efficiency of natural light modulation and to realize the thinness of the device.

In order to make the objects, technical solutions, and advantages of the disclosure more apparent, the disclosure will be described below in further details with reference to the drawings. Apparently the embodiments to be described are only a part but not all of the embodiments of the disclosure. Based upon the embodiments here of the disclosure, all of other embodiments which can occur to those ordinarily skilled in the art without any inventive effort shall come into the scope of the disclosure as claimed.

The liquid crystal lens provided by the embodiments of the disclosure is described in details below with reference to the accompanying drawings.

The sizes and shapes of respective components in the drawings are not intended to reflect any real proportion, but merely intended to illustrate the disclosure.

Figure 4:
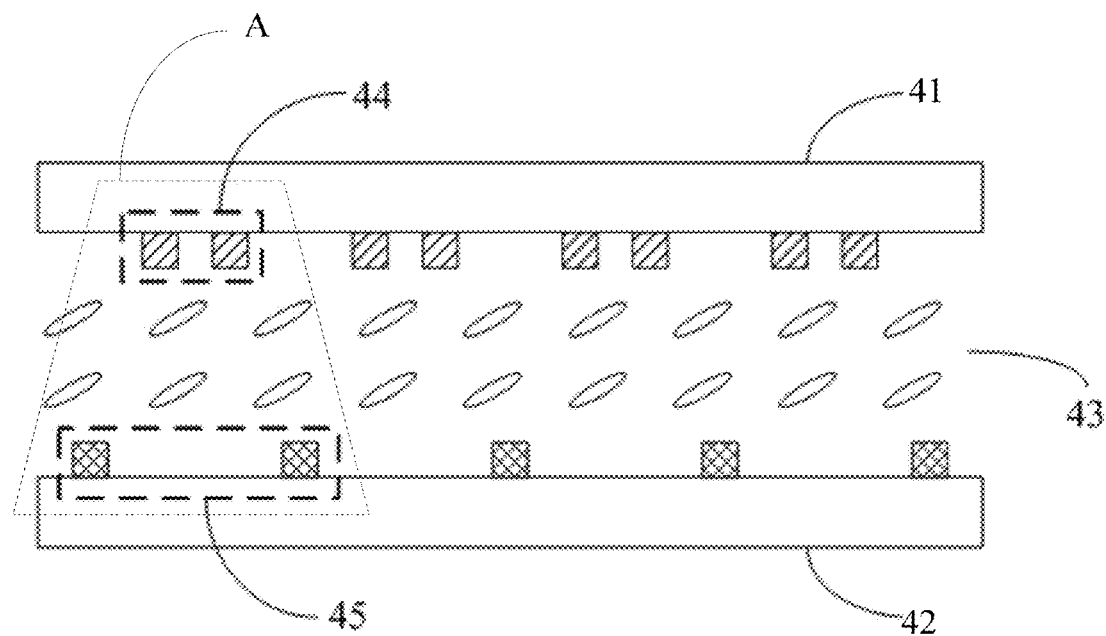
FIG. 4 is a schematic structural diagram of a liquid crystal lens according to some embodiments of the disclosure.
Figure 5A:
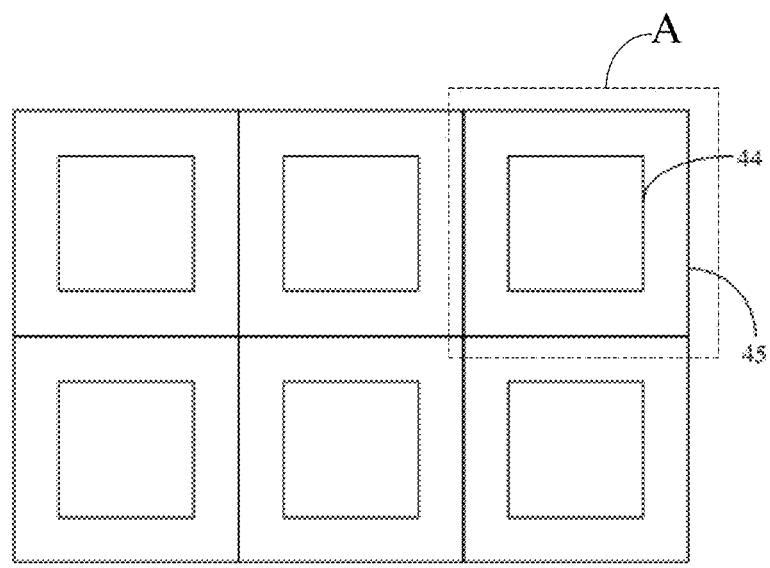
FIG. 5A and FIG. 5B are respective schematic structural diagrams of an upper electrode and a lower electrode of a liquid crystal lens according to some embodiments of the disclosure in a top view.
Figure 5B:
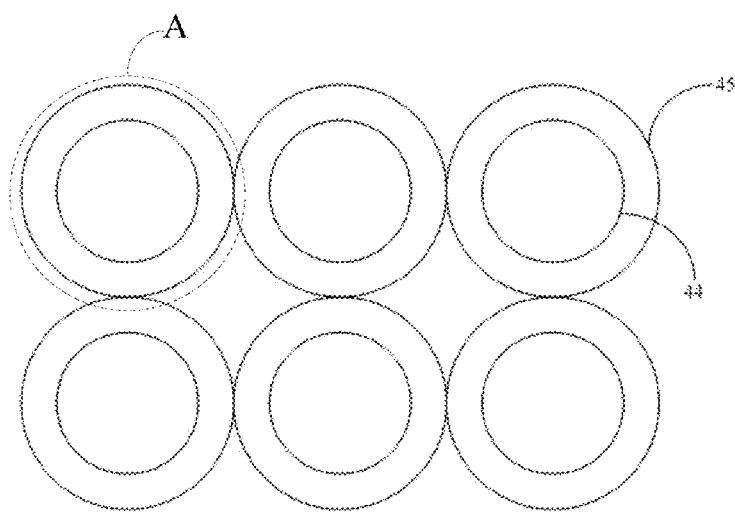

As illustrated in FIG. 4, the embodiments of the disclosure provide a liquid crystal lens, including: an upper substrate 41; a lower substrate 42 arranged opposite to the upper substrate 41; liquid crystal molecules 43 located between the upper substrate 41 and the lower substrate 42; a plurality of upper electrodes 44 located on the upper substrate 41; and a plurality of lower electrodes 45 located on the lower substrate 42, where each of the plurality of lower electrode 45 includes a plurality of metal wire grid polarizers (not illustrated in FIG. 4, but illustrated by 451 in FIG. 8), the plurality of upper electrodes 44 correspond to the plurality of lower electrodes 45 in a one-to-one manner, and as illustrated in FIG. 5a and FIG. 5b, an orthographic projection of each upper electrode 44 and an orthographic projection of a corresponding lower electrode 45 onto the lower substrate 42 form an encircled electrode element A, and each upper electrode 44 and the corresponding lower electrode 45 are configured to receive voltage at different potentials.

Particularly, in the liquid crystal lens according to the embodiments of the disclosure, the term "a plurality of" indicates that a corresponding number is more than one.

Particularly, in the liquid crystal lens according to the embodiments of the disclosure, the metal wire grid polarizers included in each lower electrode 45 can perform polarization processing on the incident natural light, and enable polarized light which is perpendicular to directions of slits in the metal wire grid polarizers to pass through, thereby controlling a polarization state of the incident light; further, voltage at different potentials is applied to an upper electrode 44 and a lower electrode 45 in each encircled electrode element A to form an electric field for driving the liquid crystal molecules 43, thus result in gradient change of refractive index of the liquid crystal molecules 43 and form a corresponding equivalent lens structure, thereby modulation on the polarized light after being subjected to the polarization processing of the metal wire grid polarizers can be performed. Compared with the single-layer liquid crystal cell in the related art, the liquid crystal lens according to the embodiments of the disclosure can improve the efficiency of modulating the natural light; and compared with the double-layer liquid crystal cell in the related art, the liquid crystal lens according to the embodiments of the disclosure can realize the thinness of the device while improving the efficiency of modulating the natural light.

Optionally, in the liquid crystal lens according to the embodiments of the disclosure, as illustrated in FIG. 5A and FIG. 5B, the upper electrodes 44 and the lower electrodes 45 which form the encircled electrode elements A have consistent shapes, and spacing between orthographic projections of the upper electrodes and orthographic projections of corresponding lower electrodes onto the lower substrate 42 are identical. Therefore, the encircled electrode elements can form the electrode structures of the lens to further prevent formation of disordered electric fields.

Optionally, in the liquid crystal lens according to the embodiments of the disclosure, FIG. 5A and FIG. 5B illustrate structural diagrams of the upper electrodes 44 and the lower electrodes 45 in a top view, where each encircled electrode element A formed by an upper electrode 44 and a lower electrode 45 can be a frame-shaped encircled electrode element A as illustrated in FIG. 5A or an annular electrode element A as illustrated in FIG. 5B, although the embodiments of the disclosure will not be limited thereto.

Optionally, in the liquid crystal lens according to the embodiments of the disclosure, each upper electrode 44 can be a circular ring, each corresponding lower electrode 45 can also be a circular ring, and centers of the two circular rings overlap with each other; the annular electrode elements are good for formation of a focus, thereby better preventing the formation of the disordered electric fields. Of course, in an actual design, each upper electrode 44 and each lower electrode 45 can also be in other shapes, and the embodiments of the disclosure does not make any restrictions to the shapes of both the upper electrode and the lower electrode.

Figure 6:
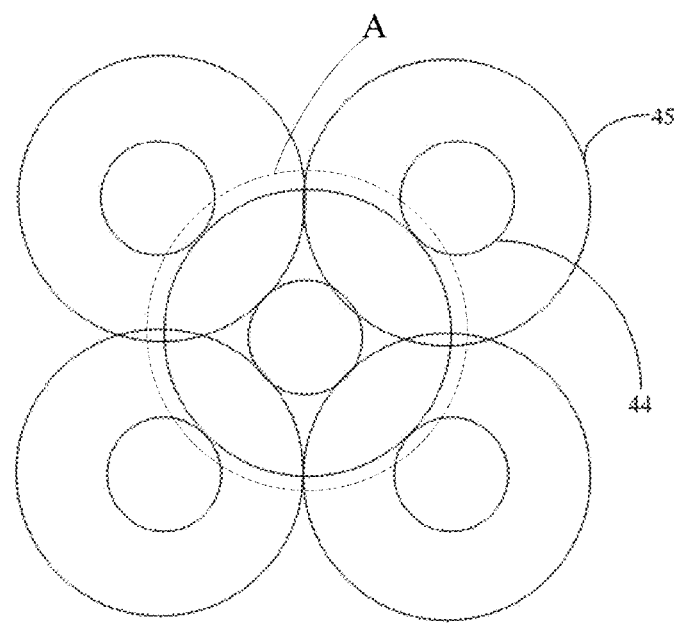
FIG. 6 is a schematic structural diagram of an upper electrode and a lower electrode of a liquid crystal lens according to some embodiments of the disclosure in a top view.

Optionally, in the liquid crystal lens according to the embodiments of the disclosure, as illustrated in FIG. 6, each encircled electrode element A overlaps with at least one surrounding encircled electrode element A, and such setting is good for utilization of spatial distribution.

Optionally, as illustrated in FIG. 6, each encircled electrode element A overlaps with four surrounding encircled electrode elements A. Particularly, when each encircled electrode element A is an annular electrode element, each annular electrode element is arranged with four surrounding annular electrode elements intersecting with the annular electrode element, and respective annular electrode elements have a same size. Thus, by adoption of the design of the intersecting annular electrode elements, for any one annular electrode element, there are four annular electrode elements intersecting with the annular electrode element, and the spatial distribution is utilized maximally.

Optionally, in the liquid crystal lens according to the embodiments of the disclosure, encircled electrode elements A at different positions can be controlled to work at different time, thus, positions of lens structures corresponding to respective encircled electrode elements A are different and variable positions of the lens structures are accordingly realized.

Optionally, in the liquid crystal lens according to the embodiments of the disclosure, the metal wire grid polarizers 451 can be arranged at a side of the lower substrate 42 away from the liquid crystal molecules 43; or the metal wire grid polarizers 451 can be arranged at a side of the lower substrate 42 proximate to the liquid crystal molecules 43, although the embodiments of the disclosure will not be limited thereto. Where FIG. 8 only illustrates the situation that the metal wire grid polarizers 451 are arranged at the side of the lower substrate 42 proximate to the liquid crystal molecules 43.

Figure 7:
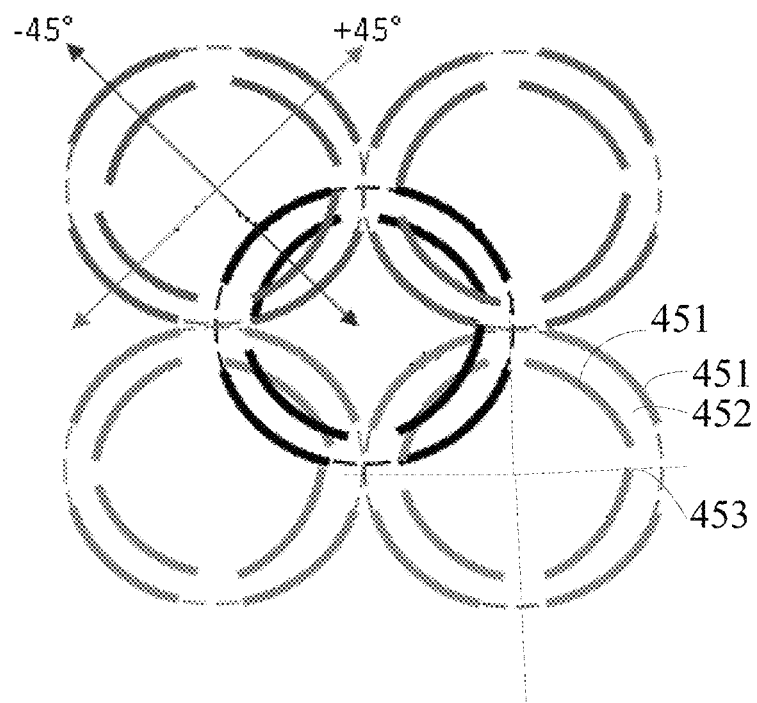
FIG. 7 is a schematic structural diagram of a metal wire grid polarizer included by a lower electrode of a liquid crystal lens according to some embodiments of the disclosure.

Optionally, in the liquid crystal lens according to the embodiments of the disclosure, as illustrated in FIG. 7, a slit 452 with an encircled structure exists between two adjacent metal wire grid polarizers 451 in each lower electrode 45. Of course, the slit 452 may have different shapes based on different shapes of the metal wire grid polarizers 451.

Optionally, in the liquid crystal lens according to the embodiments of the disclosure, as illustrated in FIG. 7, each metal wire grid polarizer 451 in each lower electrode 45 is divided into multiple sections by multiple gaps 453 which point to outside from a center of a corresponding encircled electrode element A.

Optionally, in the liquid crystal lens according to the embodiments of the disclosure, as illustrated in FIG. 7, included angles between adjacent gaps 453 are same. And by taking the included angles between the adjacent gaps 453 being equal to 90° as an example in FIG. 7, each metal wire grid polarizer is divided into 4 sections. Since the metal wire grid polarizers 451 only allow polarized light which is perpendicular to the direction of the slit 452 to pass through, a pattern of the slit 452 between the metal wire grid polarizers 451 are divided into multiple pairs of slits 452 by the gaps 453, each pair of slits 452 can act on light in one polarization direction, and the pattern of the slit 452 between the metal wire grid polarizers 451 are made into four pairs of slits 452 as illustrated in FIG. 7, thus modulation can be performed on polarized light in an angle ranges from −45 degrees to 45 degrees; and if the pattern of the slit 452 of the metal wire grid polarizers 451 are made into more pairs, modulation can be performed on polarized light in more directions.

Optionally, in the liquid crystal lens according to the embodiments of the disclosure, the liquid crystal molecules 43 can be blue phase liquid crystal molecules which have better anisotropy under an action of an electric field, and the blue phase liquid crystal molecules can be oriented without setting an orientation layer separately.

The modulation of the liquid crystal lens of the embodiments of the disclosure for the incident light is described in details below with reference to FIG. 8.

Figure 8:
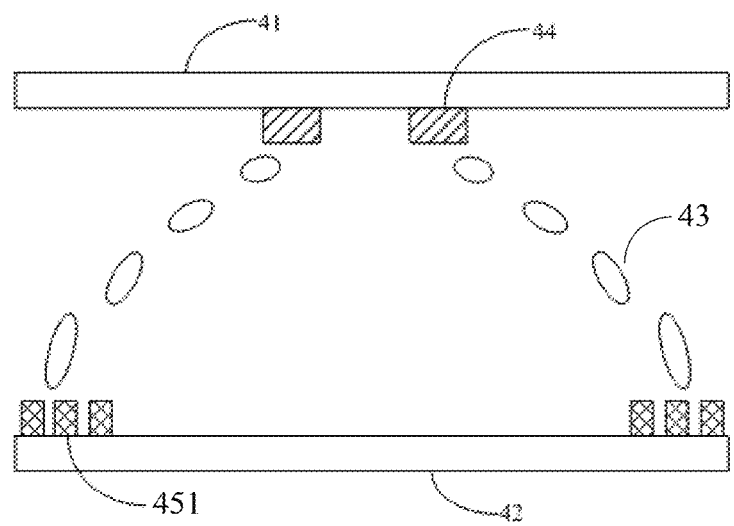
FIG. 8 is an orientation schematic diagram of liquid crystal molecules according to some embodiments of the disclosure.

FIG. 8 is a side view of FIG. 7 after being cut in a direction of 45 degrees. Taking the fact that the voltage applied to each upper electrode 44 is 0V, the voltage applied to each lower electrode 45 is 20V and the liquid crystal molecules 43 are blue phase liquid crystal molecules as an example, since the blue phase liquid crystal molecules have the Kerr effect, anisotropy is generated under the action of the electric field formed by the upper electrodes 44 and the lower electrodes 45; and as each upper electrode 44 and a corresponding lower electrode 45 form an annular electrode, a gradually varied refractive index gradient of the liquid crystal molecules 43 is generated and modulation for the polarized light in the 45 degrees direction in FIG. 7 is accordingly realized. Similarly, the lower electrodes 45 as illustrated in FIG. 7 can also perform modulation on the polarized light in the −45 degrees direction in FIG. 7.

Figure 9:
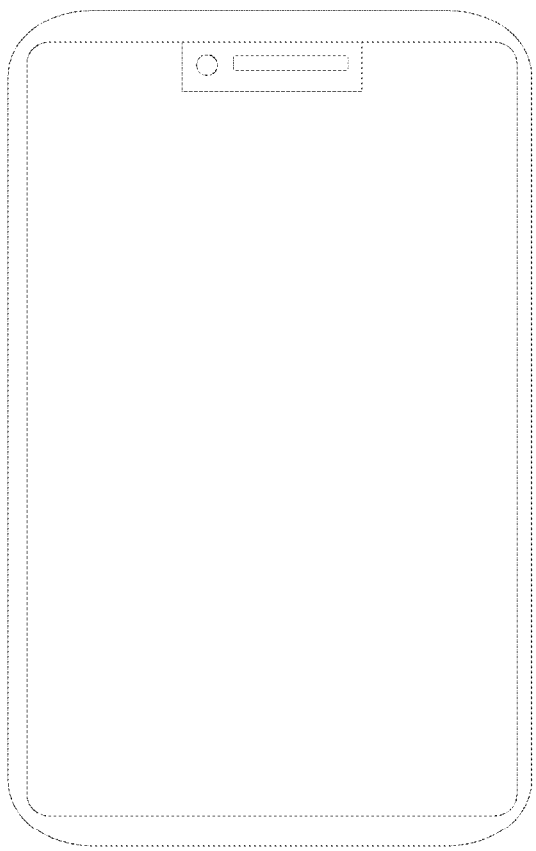
FIG. 9 is a schematic structural diagram of a display device according to some embodiments of the disclosure.

Based on the same inventive concept, the embodiments of the disclosure further provide a display device as illustrated in FIG. 9. The display device includes the liquid crystal lens above according to the embodiments of the disclosure; and the display device can be any product or component with a display function such as a mobile phone, a tablet computer, a liquid crystal television, an OLED (Organic Light Emitting Diode) TV, a notebook computer, a digital photo frame and a navigator. All the other indispensable components of the display device shall readily occur to those ordinarily skilled in the art, so a repeated description thereof will be omitted here.

In conclusion, in the liquid crystal lens according to the embodiments of the disclosure, the metal wire grid polarizers included in each lower electrode can perform polarization processing on the incident natural light, and enable polarized light which is perpendicular to the directions of the slits in the metal wire grid polarizers to pass through, thereby controlling the polarization state of the incident light; further, voltage at different potentials is applied to the upper electrodes and the lower electrodes in respective encircled electrode elements to form an electric field to drive the liquid crystal molecules, thus result in gradient change of refractive index of the liquid crystal molecules and form a corresponding equivalent lens structure, thereby modulation on the polarized light after being subjected to the polarization processing of the metal wire grid polarizers can be performed. Compared with the single-layer liquid crystal cell in the related art, the liquid crystal lens according to the embodiments of the disclosure can improve the efficiency of natural light modulation; and compared with the double-layer liquid crystal cell in the related art, the liquid crystal lens according to the embodiments of the disclosure can realize the thinness of the device while improving the efficiency of natural light modulation.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A liquid crystal lens, comprising:
   an upper substrate;
   a lower substrate, arranged opposite to the upper substrate;

liquid crystal molecules, located between the upper substrate and the lower substrate;
a plurality of upper electrodes, located on the upper substrate; and
a plurality of lower electrodes, located on the lower substrate, wherein each of the plurality of lower electrodes comprises a plurality of metal wire grid polarizers, the plurality of upper electrodes correspond to the plurality of lower electrodes in a one-to-one manner, an orthographic projection of each of the plurality of upper electrodes and an orthographic projection of a corresponding lower electrode onto the lower substrate form an encircled electrode element, and each of the plurality of upper electrodes and the corresponding lower electrode are configured to receive voltage at different potentials.

2. The liquid crystal lens according to claim 1, wherein each of the plurality of upper electrodes and the corresponding lower electrode which form the encircled electrode element have consistent shapes, and spacing between the orthographic projection of each of the plurality of upper electrodes and the orthographic projection of the corresponding lower electrode onto the lower substrate is identical.

3. The liquid crystal lens according to claim 1, wherein the plurality of upper electrodes and the plurality of lower electrodes are annular.

4. The liquid crystal lens according to claim 1, wherein each encircled electrode element and at least one surrounding encircled electrode element are arranged in an overlapping manner.

5. The liquid crystal lens according to claim 4, wherein each encircled electrode element and four surrounding encircled electrode elements are arranged in an overlapping manner.

6. The liquid crystal lens according to claim 1, wherein the plurality of metal wire grid polarizers are arranged at a side of the lower substrate away from the liquid crystal molecules; or the plurality of metal wire grid polarizers are arranged at a side of the lower substrate proximate to the liquid crystal molecules.

7. The liquid crystal lens according to claim 1, wherein a slit with an encircled structure exists between two adjacent metal wire grid polarizers in each of the plurality of lower electrodes.

8. The liquid crystal lens according to claim 1, wherein each of the plurality of metal wire grid polarizers in each of the plurality of lower electrodes is divided into multiple sections by multiple gaps which point to outside from a center of the encircled electrode element.

9. The liquid crystal lens according to claim 8, wherein included angles between adjacent gaps are same.

10. The liquid crystal lens according to claim 1, wherein the liquid crystal molecules are blue phase liquid crystal molecules.

11. A display device, comprising a liquid crystal lens, wherein the liquid crystal lens comprises:
an upper substrate;
a lower substrate, arranged opposite to the upper substrate;
liquid crystal molecules, located between the upper substrate and the lower substrate;
a plurality of upper electrodes, located on the upper substrate; and
a plurality of lower electrodes, located on the lower substrate, wherein each of the plurality of lower electrodes comprises a plurality of metal wire grid polarizers, the plurality of upper electrodes correspond to the plurality of lower electrodes in a one-to-one manner, an orthographic projection of each of the plurality of upper electrodes and an orthographic projection of a corresponding lower electrode onto the lower substrate form an encircled electrode element, and each of the plurality of upper electrodes and the corresponding lower electrode are configured to receive voltage at different potentials.

12. The display device according to claim 11, wherein each of the plurality of upper electrodes and the corresponding lower electrode which form the encircled electrode element have consistent shapes, and spacing between the orthographic projection of each of the plurality of upper electrodes and the orthographic projection of the corresponding lower electrode onto the lower substrate is identical.

13. The display device according to claim 11, wherein the plurality of upper electrodes and the plurality of lower electrodes are annular.

14. The display device according to claim 11, wherein each encircled electrode element and at least one surrounding encircled electrode element are arranged in an overlapping manner.

15. The display device according to claim 14, wherein each encircled electrode element and four surrounding encircled electrode elements are arranged in an overlapping manner.

16. The display device according to claim 11, wherein the plurality of metal wire grid polarizers are arranged at a side of the lower substrate away from the liquid crystal molecules; or the plurality of metal wire grid polarizers are arranged at a side of the lower substrate proximate to the liquid crystal molecules.

17. The display device according to claim 11, wherein a slit with an encircled structure exists between two adjacent metal wire grid polarizers in each of the plurality of lower electrodes.

18. The display device according to claim 11, wherein each of the plurality of metal wire grid polarizers in each of the plurality of lower electrodes is divided into multiple sections by multiple gaps which point to outside from a center of the encircled electrode element.

19. The display device according to claim 18, wherein included angles between adjacent gaps are same.

20. The display device according to claim 11, wherein the liquid crystal molecules are blue phase liquid crystal molecules.

* * * * *